United States Patent
Hebrink et al.

(10) Patent No.: US 8,182,924 B2
(45) Date of Patent: May 22, 2012

(54) OPTICAL BODY HAVING POLYACRYLATE SKIN LAYER

(75) Inventors: Timothy J. Hebrink, Scandia, MN (US); Stephen A. Johnson, Woodbury, MN (US); Kristopher J. Derks, Woodbury, MN (US); Kevin M. Hamer, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/780,312

(22) Filed: May 14, 2010

(65) Prior Publication Data

US 2010/0221491 A1 Sep. 2, 2010

Related U.S. Application Data

(63) Continuation of application No. 11/144,302, filed on Jun. 3, 2005, now abandoned.

(51) Int. Cl.
*B32B 7/06* (2006.01)
*B32B 27/18* (2006.01)
*B32B 27/30* (2006.01)
*B32B 27/32* (2006.01)
*B32B 27/36* (2006.01)

(52) U.S. Cl. ........ 428/483; 428/212; 428/421; 428/480; 428/522; 428/523; 428/40.1; 428/41.5; 428/41.8; 525/199; 525/222

(58) Field of Classification Search .................. None
See application file for complete search history.

(56) References Cited

U.S. PATENT DOCUMENTS

| | | | |
|---|---|---|---|
| 4,230,768 A | 10/1980 | Hamada et al. | |
| 4,429,005 A | 1/1984 | Penn | |
| RE31,780 E | 12/1984 | Cooper | |
| 4,626,460 A | 12/1986 | Duncan | |
| 4,696,965 A | 9/1987 | Rasmussen | |
| 4,737,410 A | 4/1988 | Kantner | |
| 4,759,816 A | 7/1988 | Kasper et al. | |
| 5,006,582 A | 4/1991 | Mancinelli | |
| 5,103,337 A * | 4/1992 | Schrenk et al. | 359/359 |
| 5,122,905 A * | 6/1992 | Wheatley et al. | 359/586 |
| 5,126,880 A * | 6/1992 | Wheatley et al. | 359/587 |
| 5,141,685 A * | 8/1992 | Maier et al. | 264/45.3 |
| 5,262,894 A * | 11/1993 | Wheatley et al. | 359/586 |
| 5,269,995 A | 12/1993 | Ramanathan et al. | |
| 5,278,694 A * | 1/1994 | Wheatley et al. | 359/359 |
| RE34,605 E | 5/1994 | Schrenk | |
| 5,549,941 A | 8/1996 | Banyay et al. | |
| 5,686,703 A * | 11/1997 | Yamaguchi | 174/259 |
| 5,811,493 A * | 9/1998 | Kent | 525/92 F |
| 5,882,774 A | 3/1999 | Jonza et al. | |

(Continued)

FOREIGN PATENT DOCUMENTS

EP 0 592 284 A 4/1994

(Continued)

*Primary Examiner* — Vivian Chen
(74) *Attorney, Agent, or Firm* — Steven E. Skolnick

(57) ABSTRACT

A multilayer optical body is disclosed. The optical body includes an optical film including polyester, a first skin layer is disposed on at least one side of the polyester optical film, and a strippable skin layer is disposed on the first skin layer. The first skin layer includes a mixture of a polyacrylate and an anti-static polymer. Methods of making such optical bodies are also disclosed.

13 Claims, 1 Drawing Sheet

U.S. PATENT DOCUMENTS

| | | | |
|---|---|---|---|
| 6,016,618 A * | 1/2000 | Attia et al. | 40/633 |
| 6,146,756 A | 11/2000 | Ausen et al. | |
| 6,210,524 B1 | 4/2001 | Josephy | |
| 6,224,976 B1 | 5/2001 | Takushima et al. | |
| 6,268,961 B1 | 7/2001 | Nevitt et al. | |
| 6,277,303 B1 | 8/2001 | Foulger | |
| 6,352,761 B1 | 3/2002 | Hebrink et al. | |
| 6,352,762 B1 | 3/2002 | Shimizu et al. | |
| 6,362,271 B1 * | 3/2002 | Lin et al. | 524/520 |
| 6,368,699 B1 | 4/2002 | Gilbert et al. | |
| 6,459,514 B2 | 10/2002 | Gilbert et al. | |
| 6,475,608 B2 | 11/2002 | Allen et al. | |
| 6,498,683 B2 * | 12/2002 | Condo et al. | 359/589 |
| 6,596,375 B2 * | 7/2003 | Murata et al. | 428/144 |
| 6,624,273 B1 | 9/2003 | Everaerts et al. | |
| 6,673,425 B1 | 1/2004 | Hebrink et al. | |
| 6,734,256 B1 | 5/2004 | Everaerts et al. | |
| 6,737,154 B2 | 5/2004 | Jonza et al. | |
| 6,777,053 B1 | 8/2004 | Gunter | |
| 6,827,886 B2 | 12/2004 | Neavin et al. | |
| 6,830,713 B2 | 12/2004 | Hebrink et al. | |
| 6,842,288 B1 * | 1/2005 | Liu et al. | 359/586 |
| 6,849,328 B1 | 2/2005 | Medwick et al. | |
| 6,926,952 B1 | 8/2005 | Weber et al. | |
| 6,939,911 B2 * | 9/2005 | Tosaki et al. | 524/522 |
| 6,991,828 B2 * | 1/2006 | Husemann et al. | 427/208.4 |
| 6,998,175 B2 * | 2/2006 | Murata et al. | 428/354 |
| 7,604,381 B2 * | 10/2009 | Hebrink et al. | 362/317 |
| 2001/0013668 A1 | 8/2001 | Neavin et al. | |
| 2001/0036545 A1 * | 11/2001 | Nishi et al. | 428/315.7 |
| 2002/0180107 A1 | 12/2002 | Jackson et al. | |
| 2002/0190406 A1 | 12/2002 | Merrill et al. | |
| 2004/0099992 A1 | 5/2004 | Merrill et al. | |
| 2004/0099993 A1 | 5/2004 | Jackson et al. | |
| 2004/0191550 A1 * | 9/2004 | Maekawa et al. | 428/500 |
| 2004/0219338 A1 * | 11/2004 | Hebrink et al. | 428/202 |
| 2005/0117217 A1 | 6/2005 | Yamaoka et al. | |
| 2006/0093809 A1 * | 5/2006 | Hebrink et al. | 428/323 |
| 2006/0227421 A1 * | 10/2006 | Stover et al. | 359/485 |
| 2006/0228592 A1 * | 10/2006 | Stover et al. | 428/910 |
| 2008/0217799 A1 * | 9/2008 | Stover et al. | 264/1.34 |
| 2010/0188751 A1 * | 7/2010 | Clarke et al. | 359/599 |
| 2010/0219540 A1 * | 9/2010 | Hebrink et al. | 264/1.6 |
| 2010/0221490 A1 * | 9/2010 | Hebrink et al. | 428/141 |

FOREIGN PATENT DOCUMENTS

| | | |
|---|---|---|
| EP | 0 923 988 | 6/1999 |
| JP | 60-260902 | * 12/1985 |
| JP | 06-043322 | 2/1994 |
| JP | 2002-328226 | * 11/2002 |
| WO | WO 95/17303 | 6/1995 |
| WO | WO 95/17691 | 6/1995 |
| WO | WO 95/17692 | 6/1995 |
| WO | WO 95/17699 | 6/1995 |
| WO | WO 96/19347 | 6/1996 |
| WO | WO 97/32226 | 9/1997 |
| WO | WO 99/36262 | 7/1999 |
| WO | WO 99/36812 | 7/1999 |

* cited by examiner

OPTICAL BODY HAVING POLYACRYLATE SKIN LAYER

CROSS-REFERENCE TO RELATED APPLICATION

This application is a continuation of U.S. Ser. No. 11/144, 302, filed Jun. 3, 2005, abandoned, the disclosure of which is incorporated by reference in its entirety herein.

FIELD OF THE DISCLOSURE

The present disclosure relates to optical bodies and methods of making optical bodies including acrylate blend layers.

BACKGROUND

Polymeric optical films are used in a wide variety of applications. Particular uses of polymeric films include mirrors and polarizers. Such reflective films are used, for example, in conjunction with backlights in liquid crystal displays. A polarizing film can be placed between the user and the backlight to recycle polarized light that would be otherwise absorbed, and thereby increasing brightness. A mirror film can be placed behind the backlight to reflect light towards the user; thereby enhancing brightness. These polymeric optical films often have extremely high reflectivity, while being lightweight and resistant to breakage. Thus, the films are suited for use as reflectors and polarizers in compact electronic displays, such as liquid crystal displays (LCDs) placed in mobile telephones, personal data assistants, portable computers, desktop monitors, and televisions. Another application of these polarizing films includes, for example, solar control.

One class of polymers useful in creating polarizer or mirror films is polyesters, described in U.S. Pat. Nos. 5,825,543 and 5,867,316 and PCT Publications WO 99/36262 and WO 97/32226, incorporated herein by reference. One example of a polyester-based polarizer includes a stack of polyester layers of differing composition. One configuration of this stack of layers includes a first set of birefringent layers and a second set of layers with an isotropic index of refraction. The second set of layers alternates with the birefringent layers to form a series of interfaces for reflecting light.

Although polymeric optical films can have favorable optical and physical properties, one limitation with some such films can be dimensional instability of the film when exposed to substantial fluctuations in temperature. This dimensional instability can result in formation of wrinkles in the film as it expands and contracts. Such dimensional instability can be particularly common when temperatures approach or exceed approximately 80° C. Warping also may be observed when some films are cycled to high temperatures and high humidity conditions, such as conditions of 60° C. and 70 percent relative humidity.

Another limitation of some polymeric optical films is that they fail to dissipate static charges. Static charges on a polymeric optical film can be detrimental to the assembly of optical devices including such films, and can cause static attraction to other films or glass in the backlight display. The static attraction to other films or glass in the backlight display may sometimes cause visual defects manifesting themselves as circular shadows or variations in brightness. In addition, many static dissipative materials are not compatible with polymeric optical film materials.

Another limitation of some polymeric optical films is their tendency to degrade when exposed for long periods of time to the UV light from fluorescent bulbs in backlight displays. These optical films can become undesirably yellow from UV light-induced degradation.

SUMMARY

This disclosure is directed to optical bodies and methods of making optical bodies. More specifically, this disclosure is directed to polyester optical bodies that include polyacrylate blend skin layers and strippable skin layers, and to co-extrusion methods of making such optical bodies.

One exemplary embodiment of an optical body includes an optical film including polyester, an extruded inner skin layer disposed onto the polyester optical film, and an extruded strippable skin layer disposed on top of the inner skin layer. The extruded inner skin layer includes a mixture of a polyacrylate and a second polymer. In some embodiments, the second polymer is miscible in the polyacrylate. In other embodiments, the second polymer is not miscible or is substantially immiscible in the polyacrylate and the second polymer has a refractive index in a range from 1.45 to 1.53. In further exemplary embodiments, the second polymer may be an anti-static polymer. The skin layers can optionally include light stabilizers and/or light absorbers.

Yet other exemplary embodiments of the disclosure include methods of making an optical body. The methods include coextruding an optical layer including polyester with a first skin layer and a first strippable skin layer. The first skin layer includes a mixture of a polyacrylate and a second polymer. The first skin layer is disposed between the optical layer and the first strippable skin layer to form an optical film. In some embodiments, the optical film is biaxially orientated. The strippable skin layer can optionally be removed from the skin layer, as desired.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

Figure 1:
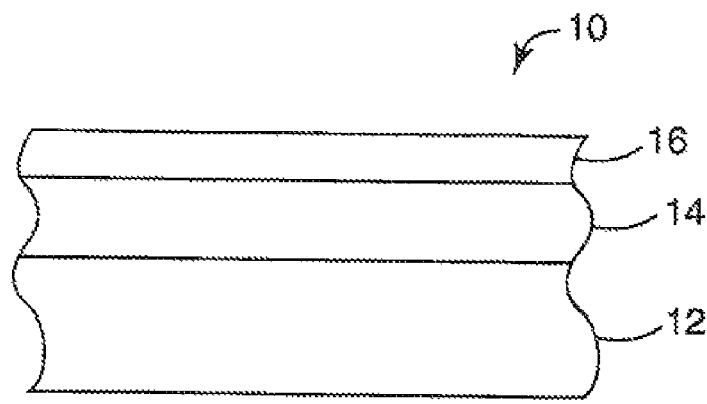
FIG. 1 is a schematic side elevation view of one embodiment of an optical body constructed and arranged in accordance with the disclosure.

The following description should be read with reference to the drawings, in which like elements in different drawings are numbered in like fashion. The drawings, which are not necessarily to scale, depict selected illustrative embodiments and are not intended to limit the scope of the disclosure. Although examples of construction, dimensions, and materials are illustrated for the various elements, those skilled in the art will recognize that many of the examples provided have suitable alternatives that may be utilized.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

Weight percent, percent by weight, % by weight, % wt, and the like are synonyms that refer to the concentration of a substance as the weight of that substance divided by the weight of the composition and multiplied by 100.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to a composition containing "a layer" encompass embodiments having one, two or more layers. As used in this specification and the appended claims, the term "or" is generally employed in its sense including "and/or" unless the content clearly dictates otherwise.

This disclosure is generally directed to optical bodies and methods of making optical bodies. More specifically, this disclosure is directed to polyester optical bodies that include polyacrylate blend skin layers and strippable skin layers, and to co-extrusion methods of making such optical bodies. The disclosed exemplary optical films may have improved optical, physical, and/or mechanical properties with the use of polyacrylate blend skin layers.

In many embodiments, the polyacrylate blend skin layer assists the optical film to resist warping. In other words, warping of the optical film may be reduced by use of the disclosed polyacrylate blend skin layer with the optical film. The disclosed polyacrylate blend skin layer is considered dimensionally stable because the disclosed polyacrylate blend skin layer does not substantially warp under conditions, such as elevated temperature, elevated humidity, or both, that typically cause appreciable warpage of the optical film.

Blending or mixing miscible, immiscible or substantially immiscible polymers into the polyacrylate skin layer provides improved resistance to warping or buckling of the optical film when exposed to thermal cycling. In addition, the low refractive index of polyacrylates allows the blending with inherently anti-static polymers that have nearly matching refractive indices without producing excessive haze. In some embodiments, these anti-static polymers are immiscible or substantially immiscible in polyacrylate. In other embodiments, they may be miscible.

Polyacrylate based blends have a low ultraviolet (UV) light absorption band edge, thus, polyacrylates are easy to protect from UV degradation. When these polyacrylate blend skin layers are loaded with UV absorbers (UVA), these polyacrylate blend skin layers protect the underlying polyester optical film. UVA additives include, for example, triazoles, triazines, and benzotriazoles. In some embodiments, UVA additives include Tinuvin 1577 (a triazine with low volatility and high compatibility with a variety of polymers), Tinuvin 405 (a triazine exhibiting high thermal stability and photo-permanence), and CGL-139 (a red-shifted benzotriazole exhibiting excellent photo-permanence and high solubility into a variety of materials), all being available from Ciba Specialty Chemicals.

Polyacrylate based blend skin layers also have a number of advantageous physical properties. Polyacrylate based blend skin layers have lower refractive indices that can reduce surface reflection and thus improve light transmission through the optical film. Polyacrylate based blend skin layers have improved adhesion to film coatings and other substrates. Polyacrylate based blend skin layers have improved scratch resistance.

In many embodiments, a polyester optical film cannot be co-extruded with a polyacrylate skin layer without thermal degradation of the polyacrylate skin layer. However, co-extruding an outer skin layer (e.g., a strippable skin layer) with the polyacrylate skin layer, has been found to protect the polyacrylate skin layer from thermal degradation. The outer skin layer can be subsequently removed from the skin layer to reveal a polyester optical film with a polyacrylate (or polyacrylate blend) skin layer having advantageous properties, some of which are described above.

Figure 2:
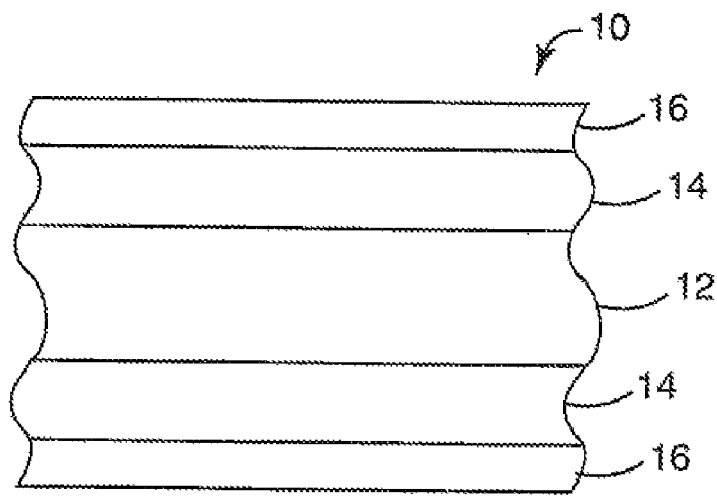
FIG. 2 is a schematic side elevation view of another embodiment of an optical body constructed and arranged in accordance with the disclosure.

Reference is now made to FIG. 1 and FIG. 2, which show various general embodiments of the disclosure. In FIG. 1, optical body 10 includes an optical film 12, a skin layer 14, and a strippable layer 16. FIG. 2 illustrates another embodiment of an optical body 10. The optical body includes an optical film 12 disposed between two skin layers 14. A strippable layer 16 is disposed on each skin layer 14. The three layers in the illustrative examples depicted in FIG. 1 and FIG. 2 show the thickest layer being the optical film layer 12, followed in thickness by the skin layer 14 and the strippable layer 16. However, the layers 12, 14, 16 can be constructed to have different relative thicknesses than those shown in FIG. 1 and FIG. 2. These various components, along with methods of making the optical body of the disclosure, are described below.

Various optical films are suitable for use with the present disclosure. In many embodiments, the optical films are multilayer optical films, including multilayer films (whether composed of all birefringent optical layers, some birefringent optical layers, or all isotropic optical layers) having a high reflectivity over a wide bandwidth, and continuous/disperse phase optical films. These optical films include polarizers and mirrors, for example. In general, multilayer optical films can be specularly reflective and continuous/disperse phase optical films can be diffusely reflective, although these characterizations are not universal (see, e.g., the diffuse multilayer reflective polarizers described in U.S. Pat. No. 5,867,316). These optical films are merely illustrative and are not meant to be an exhaustive list of suitable polymeric optical films useful with the present disclosure.

Both multilayer reflective polarizer optical films and continuous/disperse phase polarizer optical films rely on index of refraction differences between at least two different materials (such as, for example, polymers) to selectively reflect light of at least one polarization orientation. Suitable diffuse reflective polarizers include the continuous/disperse phase reflective polarizer optical films described in U.S. Pat. No. 5,825,543, incorporated herein by reference, as well as the diffusely reflecting polarizer optical films described in U.S. Pat. No. 5,867,316, incorporated herein by reference.

Other optical films that are suitable for use in the present disclosure are multilayer reflective polarizer films such as those described in, for example, U.S. Pat. Nos. 5,882,774 and 6,352,761 and in PCT Publication Nos. WO95/17303; WO95/17691; WO95/17692; WO95/17699; WO96/19347; and WO99/36262, all of which are incorporated herein by reference. In some embodiments, the optical film is a multilayer stack of polymer layers with a Brewster angle (the angle at which reflectance of p-polarized light goes to zero) that is very large or nonexistent. The optical film can be made into a multilayer mirror or polarizer whose reflectivity for p-polarized light decreases slowly with angle of incidence, is independent of angle of incidence, or increases with angle of incidence away from the normal. Commercially available forms of such multilayer reflective polarizers are marketed as Dual Brightness Enhanced Film (DBEF) by 3M, St. Paul, Minn. Multilayer reflective optical films are used herein as an example to illustrate optical film structures and methods of making and using the optical films of the disclosure. The structures, methods, and techniques described herein can be adapted and applied to other types of suitable optical films.

A suitable multilayer reflective optical film can be made by alternating (e.g., interleaving) uniaxially- or biaxially-oriented birefringent first optical layers with second optical layers. In some embodiments, the second optical layers have an isotropic index of refraction that is approximately equal to one of the in-plane indices of the oriented layer. The interface between the two different optical layers forms a light reflection plane. Light polarized in a plane parallel to the direction in which the indices of refraction of the two layers are approximately equal will be substantially transmitted. Light polarized in a plane parallel to the direction in which the two layers have different indices will be at least partially reflected. The reflectivity can be increased by increasing the number of layers or by increasing the difference in the indices of refraction between the first and second layers. Generally, multilayer optical films have 2 to 5000 optical layers, or 25 to 2000 optical layers, or 50 to 1500 optical layers, or 75 to 1000 optical layers. A film having a plurality of layers can include layers with different optical thicknesses to increase the reflectivity of the film over a range of wavelengths. For example, a film can include pairs of layers which are individually tuned (for normally incident light, for example) to achieve optimal reflection of light having particular wavelengths. It should further be appreciated that, although only a single multilayer stack may be described, the multilayer optical film can be made from multiple stacks that are subsequently combined to form the film. The described multilayer optical films can be made according to U.S. Pat. No. 6,827,886 and U.S. Patent Application Publication No. 2001/0013668, which are both incorporated herein by reference.

A polarizer can be made by combining a uniaxially-oriented first optical layer with a second optical layer having an isotropic index of refraction that is approximately equal to one of the in-plane indices of the oriented layer. Alternatively, both optical layers are formed from birefringent polymers and are oriented in a multiple draw process so that the indices of refraction in a single in-plane direction are approximately equal. The interface between the two optical layers forms a light reflection plane for one polarization of light. Light polarized in a plane parallel to the direction in which the indices of refraction of the two layers are approximately equal will be substantially transmitted. Light polarized in a plane parallel to the direction in which the two layers have different indices will be at least partially reflected. For polarizers having second optical layers with isotropic indices of refraction or low in-plane birefringence (e.g., no more than around 0.07), the in-plane indices ($n_x$ and $n_y$) of refraction of the second optical layers are approximately equal to one in-plane index (e.g., $n_y$) of the first optical layers. Thus, the in-plane birefringence of the first optical layers is an indicator of the reflectivity of the multilayer optical film. Typically, it is found that the higher the in-plane birefringence, the better the reflectivity of the multilayer optical film. If the out-of-plane indices ($n_z$) of refraction of the first and second optical layers are equal or nearly equal (e.g., no more than 0.1 difference, or no more than 0.05 difference), the multilayer optical film also has less off-angle color. Off-angle color arises from non-uniform transmission of light at angles other than normal to the plane of the multilayer optical film.

A mirror can be made using at least one uniaxially birefringent material, in which two indices (typically along the x and y axes, or $n_x$ and $n_y$) are approximately equal, and different from the third index (typically along the z axis, or $n_z$). The x and y axes are defined as the in-plane axes, in that they represent the plane of a given layer within the multilayer film, and the respective indices $n_x$ and $n_y$ are referred to as the in-plane indices. One method of creating a uniaxially birefringent system is to biaxially orient (stretch along two axes) the multilayer polymeric film. If the adjoining layers have different stress-induced birefringence, biaxial orientation of the multilayer film results in differences between refractive indices of adjoining layers for planes parallel to both axes, resulting in the reflection of light of both planes of polarization. A uniaxially birefringent material can have either positive or negative uniaxial birefringence. Positive uniaxial birefringence occurs when the index of refraction in the z direction ($n_z$) is greater than the in-plane indices ($n_x$ and $n_y$). Negative uniaxial birefringence occurs when the index of refraction in the z direction ($n_z$) is less than the in-plane indices ($n_x$ and $n_y$). If $n_{1z}$ is selected to match $n_{2x}=n_{2y}=n_{2z}$ and the multilayer film is biaxially oriented, there is no Brewster's angle for p-polarized light and thus there is constant reflectivity for all angles of incidence. Multilayer films that are oriented in two mutually perpendicular in-plane axes are capable of reflecting an extraordinarily high percentage of incident light depending of the number of layers, f-ratio, indices of refraction, etc., and are highly efficient mirrors. Mirrors can also be made using a combination of uniaxially-oriented layers with in-plane indices of refraction which differ significantly.

In some embodiments, the first optical layers are birefringent polymer layers that are uniaxially- or biaxially-oriented. Biaxial orientation can be accomplished either simultaneously or sequentially. The birefringent polymers of the first optical layers can be selected to be capable of developing a large birefringence when stretched. Depending on the application, the birefringence may be developed between two orthogonal directions in the plane of the film, between one or more in-plane directions and the direction perpendicular to the film plane, or a combination of these. The first polymer should maintain birefringence after stretching, so that the desired optical properties are imparted to the finished film. The second optical layers can be polymer layers that are birefringent and uniaxially- or biaxially-oriented or the second optical layers can have an isotropic index of refraction which is different from at least one of the indices of refraction of the first optical layers after orientation. The second polymer advantageously develops little or no birefringence when stretched, or develops birefringence of the opposite sense (positive-negative or negative-positive), such that its film-plane refractive indices differ as much as possible from those of the first polymer in the finished film. For many applications, it is advantageous for neither the first polymer nor the second polymer to have any absorbance bands within the bandwidth of interest for the film in question. Thus, all incident light within the bandwidth is either reflected or transmitted. However, for some applications, it may be useful for one or both of the first and second polymers to absorb specific wavelengths, either totally or in part. The first and second optical layers and any optional non-optical layers of the multilayer optical film are usually composed of polymers such as, for example, polyesters. The term "polymer" will be understood to include homopolymers and copolymers, as well as polymers or copolymers that may be formed in a miscible blend.

Polyesters for use in the multilayer optical films of the present disclosure generally include carboxylate and glycol subunits and are generated by reactions of carboxylate monomer molecules with glycol monomer molecules. Each carboxylate monomer molecule has two or more carboxylic acid or ester functional groups and each glycol monomer molecule has two or more hydroxy functional groups. The carboxylate monomer molecules may all be the same or there may be two or more different types of molecules. The same applies to the glycol monomer molecules. Also included within the term "polyester" are polycarbonates derived from the reaction of glycol monomer molecules with esters of carbonic acid.

Suitable carboxylate monomer molecules for use in forming the carboxylate subunits of the polyester layers include, for example, 2,6-naphthalene dicarboxylic acid and isomers thereof; terephthalic acid; isophthalic acid; phthalic acid; azelaic acid; adipic acid; sebacic acid; norbornene dicarboxylic acid; bi-cyclooctane dicarboxylic acid; 1,6-cyclohexane dicarboxylic acid and isomers thereof; t-butyl isophthalic acid, trimellitic acid, sodium sulfonated isophthalic acid; 4,4'-biphenyl dicarboxylic acid and isomers thereof; and lower alkyl esters of these acids, such as methyl or ethyl esters. The term "lower alkyl" refers, in this context, to $C_1$-$C_{10}$ straight or branched alkyl groups.

Suitable glycol monomer molecules for use in forming glycol subunits of the polyester layers include ethylene glycol; propylene glycol; 1,4-butanediol and isomers thereof; 1,6-hexanediol; neopentyl glycol; polyethylene glycol; diethylene glycol; tricyclodecanediol; 1,4-cyclohexanedimethanol and isomers thereof; norbornanediol; bicyclo-octanediol; trimethylol propane; pentaerythritol; 1,4-benzenedimethanol and isomers thereof; bisphenol A; 1,8-dihydroxy biphenyl and isomers thereof; and 1,3-bis(2-hydroxyethoxy)benzene.

In one embodiment, the first optical layers include polyethylene naphthalate (PEN), that can be made, for example, by reaction of naphthalene dicarboxylic acid with ethylene glycol. In some embodiments, polyethylene 2,6-naphthalate (PEN) is chosen as a first polymer. PEN has a large positive stress optical coefficient, retains birefringence effectively after stretching, and has little or no absorbance within the visible range. PEN also has a large index of refraction in the isotropic state. Its refractive index for polarized incident light of 550 nm wavelength increases when the plane of polarization is parallel to the stretch direction from about 1.64 to as high as about 1.9. Increasing molecular orientation increases the birefringence of PEN. The molecular orientation may be increased by stretching the material to greater stretch ratios and holding other stretching conditions fixed. Another useful polyester for the first optical layers is a polyethylene terephthalate (PET) having an intrinsic viscosity of 0.74 dL/g, available from Eastman Chemical Company (Kingsport, Tenn.). Other semicrystalline polyesters suitable as first optical layers include, for example, polybutylene naphthalate (PBN), polyhexamethylene napthalate (PHN), polybutylene terephthalate (PBT), and polyhexamethylene terephthalate (PHT). Suitable materials for the first optical layers include copolymers of PEN, PBN, PHN, PET, PBT or PHT. One example of a suitable first optical layer polymer includes coPEN having carboxylate subunits derived from 90 mol % dimethyl naphthalate dicarboxylate and 10 mol % dimethyl terephthalate and glycol subunits derived from 100 mol % ethylene glycol subunits and an intrinsic viscosity (IV) of 0.48 dL/g. The index of refraction is approximately 1.63. This polymer is herein referred to as low melt PEN (90/10). Additional materials useful as first optical layers are described, for example, in U.S. Pat. Nos. 6,268,961, 6,352,761, 6,352,762, 6,498,683, 6,830,713, all incorporated herein by reference.

Second optical layer polymers can be chosen so that in the finished film, the refractive index, in at least one direction, differs significantly from the index of refraction of the first optical layers in the same direction. Because polymeric materials are typically dispersive, that is, the refractive indices vary with wavelength, these conditions should be considered in terms of a particular spectral bandwidth of interest. It will be understood from the foregoing discussion that the choice of a second optical layer polymer is dependent not only on the intended application of the multilayer optical film in question, but also on the choice made for the first optical layer polymer, as well as processing conditions.

The second optical layers can be made from a variety of polymers having glass transition temperatures compatible with that of the first optical layer polymer and having a refractive index similar to the isotropic refractive index of the first optical layer polymer. Suitable materials for the second optical layers include copolymers of PEN, PBN, PHN, PET, PHT, or PBT. In some embodiments, these copolymers include carboxylate subunits which are 20 to 100 mol % second carboxylate subunits, such as naphthalate (for coPEN or coPBN) or terephthalate (for coPET or coPBT) subunits, and 0 to 80 mol % second comonomer carboxylate subunits. The copolymers also include glycol subunits which are 40 to 100 mol % second glycol subunits, such as ethylene (for coPEN or coPET) or butylene (for coPBN or coPBT), and 0 to 60 mol % second comonomer glycol subunits. At least about 10 mol % of the combined carboxylate and glycol subunits are second comonomer carboxylate or glycol subunits.

In some embodiments, second optical layers include homopolymers of polymethylmethacrylate (PMMA), such as those available from Ineos Acrylics, Inc., Wilmington, Del., under the trade designations CP71 and CP80, or polyethyl methacrylate (PEMA), which has a lower glass transition temperature than PMMA. Additional second optical layer polymers include copolymers of PMMA (coPMMA), such as a coPMMA made from 75 wt % methylmethacrylate (MMA) monomers and 25 wt % ethyl acrylate (EA) monomers, (available from Ineos Acrylics, Inc., under the trade designation PERSPEX CP63), a coPMMA formed with MMA comonomer units and n-butyl methacrylate (nBMA) comonomer units, or a blend of PMMA and poly(vinylidene fluoride) (PVDF) such as that available from Solvay Polymers, Inc., Houston, Tex. under the trade designation SOLEF 1008. Further second optical layer polymers include polyolefin copolymers such as poly(ethylene-co-octene) (PE-PO) available from Dow-Dupont Elastomers under the trade designation ENGAGE 8200, poly(propylene-co-ethylene) (PPPE) available from Fina Oil and Chemical Co., Dallas, Tex., under the trade designation Z9470, and a copolymer of atatctic polypropylene (aPP) and isotatctic polypropylene (iPP) available from Huntsman Chemical Corp., Salt Lake City, Utah, under the trade designation REXFLEX W111. Second optical layers can also be made from a functionalized polyolefin, such as linear low density polyethylene-g-maleic anhydride (LLDPE-g-MA) such as that available from E.I. duPont de Nemours & Co., Inc., Wilmington, Del., under the trade designation BYNEL 4105.

In some embodiments, combinations of optical layers in the case of polarizers include PEN/co-PEN, PET/co-PEN, PET/co-PET, PEN/sPS, PEN/EASTAR, and PET/EASTAR, where EASTAR is polycyclohexanedimethylene terephthalate commercially available from Eastman Chemical Co., and sPs refers to syndiotatic polystyrene.

In some embodiments, combinations of optical layers in the case of mirrors include PET/coPMMA, PEN/PMMA or PEN/coPMMA, PET/ECDEL, PEN/ECDEL, PEN/sPS, PEN/THV, and PEN/coPET, where ECDEL is a thermoplastic polyester commercially available from Eastman Chemical Co., and THV is a fluoropolymer commercially available from 3M Co. PMMA refers to polymethyl methacrylate and PETG refers to a copolymer of PET employing a second glycol (usually cyclohexanedimethanol). sPS refers to syndiotactic polystyrene.

In many embodiments, the optical films are thin. Suitable films include films of varying thickness, but particularly films less than 15 mils (about 380 micrometers) thick, or less than 10 mils (about 250 micrometers) thick, or less than 7 mils (about 180 micrometers) thick.

In addition to the first and second optical layers, the multilayer optical film optionally includes one or more non-optical layers such as, for example, one or more interior non-optical layers, such as, for example, protective boundary layers between packets of optical layers. Non-optical layers can be used to give the multilayer film structure or to protect it from harm or damage during or after processing. The non-optical layers may be of any appropriate material and can be the same as one of the materials used in the optical stack. Of course, it is important that the material chosen not have optical properties deleterious to those of the optical stack. In many embodiments, the polymers of the first optical layers, the second optical layers, and the non-optical layers are chosen to have similar rheological properties (e.g., melt viscosities) so that they can be co-extruded without flow disturbances. In some embodiments, the second optical layers, and other non-optical layers have a glass transition temperature, $T_g$, that can be either below or no greater than about 40° C. above the glass transition temperature of the first optical layers. In some embodiments, the glass transition temperature of the second optical layers, and non-optical layers is below the glass transition temperature of the first optical layers.

The thickness of the non-optical layers can be at least four times, or at least 10 times, and can be at least 100 times, the thickness of at least one of the individual first and second optical layers. The thickness of the non-optical layers can be selected to make a multilayer optical film having a particular thickness.

While the multilayer optical stacks, as described above, can provide significant and desirable optical properties, other properties, which may be mechanical, optical, or chemical, are difficult to provide in the optical stack itself without degrading the performance of the optical stack. Such properties may be provided by including one or more layers with the optical stack that provide these properties while not contributing to the primary optical function of the optical stack itself. Since these layers are typically provided on the major surfaces of the optical stack, they are often known as "skin layers."

In typical exemplary embodiments of the present disclosure, skin layers include a mixture of acrylate polymers (polyacrylates) and another polymer to form a polyacrylate blend skin layer. As described above, the polyacrylate blend skin layer can provide a number of useful properties. In many embodiments, the polyacrylate blend skin layer is normally transparent or transmissive or substantially transparent or transmissive for light within a desired wavelength range.

The polyacrylate blend skin layer(s) can be selected such that it can be extruded, remains transparent after processing at high temperatures, and is substantially stable at temperatures from at least about −30° C. to 85° C. In many embodiments, the polyacrylate blend skin layer is normally flexible, but does not significantly expand in length or width over the temperature range of −30° C. to 85° C. To the extent that the polyacrylate blend skin layer does expand over this temperature range, the expansion is substantially uniform such that the film does not show excessive wrinkling. In some embodiments, the polyacrylate blend skin layer includes, as a primary component, a polyacrylate material exhibiting a glass transition temperature ($T_g$) from 55 to 200° C., or from 85 to 160° C.

The thickness of the polyacrylate blend skin layer can vary depending upon the application. In many embodiments, the polyacrylate blend skin layer is from 0.1 to 10 mils (about 2 to 250 micrometers) thick, or from 0.5 to 8 mils (about 12 to 200 micrometers) thick, or from 1 to 7 mils (about 25 to 180 micrometers) thick.

The polyacrylate blend skin layer can include a mixture of homopolymers and/or copolymers of polyacrylate and a second polymer that is different from the polyacrylate. In some embodiments, the second polymer is miscible in the polyacrylate. In other embodiments, the second polymer is immiscible or substantially immiscible in the polyacrylate. In these immiscible embodiments, the second polymer can have a refractive index value within 0.05 or 0.04 or 0.03, or 0.02 or 0.01 of the polyacrylate refractive index value. In some immiscible embodiments, the second polymer has a refractive index in a range from 1.45 to 1.53 or from 1.46 to 1.51. The second polymer can be any useful polymer such as, for example, anti-static polymers, functionalized copolymers for improved adhesion to other polymer layers, and elastomeric polymers for improved impact resistance.

The second polymer can be used at any useful level in the polyacrylate blend skin layer. In some embodiments, the second polymer can be present in the polyacrylate blend skin layer in a range from 1 to 40 weight, or 1 to 30 weight percent, or at 5 to 20 weight percent of the material of the polyacrylate blend skin layer.

Useful anti-static materials include, for example, polyether copolymers (such as, for example, polyethylene glycol), Irgastat™ P18 from Ciba Specialty Chemicals, LR-92967 from Ampacet, Tarrytown, N.Y., Pelestat™ NC6321 and Pelestat™ NC7530 from Tomen America Inc., New York, N.Y., and ionic polymers, such as, for example, the static dissipative polymer blends (e.g., Stat-Rite™ polymer products) manufactured by Noveon, Inc., Cleveland, Ohio, further anti-static polymers include Pelestat™ 300 (Available from Sanyo Chemicals), Pelestat™ 303, Pelestat™ 230, Pelestat™ 6500, Statrite M809 (Available from Noveon), Stat-Rite™ x5201, Stat-Rite™ x5202, Irgastat™ P16 (available from Ciba Chemicals).

In some exemplary embodiments, anti-static materials can be used at levels of approximately 1 to 30 weight percent of the material of the polyacrylate blend skin layer, or at 5 to 20 weight percent.

In some embodiments, polyacrylate blend skin layer includes homopolymers of polymethylmethacrylate (PMMA), such as those available from Ineos Acrylics, Inc., Wilmington, Del., under the trade designations CP71 and CP80, or those available from Atohass North America, Inc., under the trade designations VO44, or polyethyl methacrylate (PEMA), which has a lower glass transition temperature than PMMA. In other embodiments, polyacrylate blend skin layer can include copolymers of PMMA (coPMMA), such as a coPMMA made from 75 wt % methylmethacrylate (MMA) monomers and 25 wt % ethyl acrylate (EA) monomers, (available from Ineos Acrylics, Inc., under the trade designation PERSPEX CP63), or a coPMMA formed with MMA comonomer units and n-butyl methacrylate (nBMA) comonomer units. In one embodiment, the polyacrylate blend skin layer includes a mixture or blend of PMMA and poly (vinylidene fluoride) (PVDF) such as that available from Solvay Polymers, Inc., Houston, Tex. under the trade designation SOLEF 1008. In addition, functionalized copolymers of PMMA such as ELVACITE 2044, ELVACITE 2045, ELVACITE 2895, ELVACITE 4026, and ELVACITE 4400 (all available from Lucite) can be blended with PMMA or other copolymers of PMMA to improve physical properties such as flexibility, impact resistance and adhesion to other polymer layers.

In one particular embodiment, the optical film includes PEN or coPEN and the polyacrylate blend skin layer includes PMMA. In another particular embodiment, the optical film includes PET or coPET and the polyacrylate blend skin layer includes coPMMA. Strippable skin layers including a polyolefin such as, for example, polypropylene, can be disposed on the polyacrylate blend skin layer of either embodiment.

In some embodiments, the polyacrylate blend skin layer includes a UV light absorber (UVA) and/or a hindered amine light stabilizer (HALS). UV light absorber can function by competitively absorbing UV energy that can cause photodegradation of a structure. A wide variety of ultraviolet light absorbing compounds are commercially available including, for example, benzophenones (available under the CYASORB tradename, Cytec Indus., Wester Peterson, N.J.) and triazines (available under the TINUVIN tradename, Ciba Specialty Chemicals). In some embodiments, a UV light absorber is present in the polyacrylate blend skin layer in an amount between 0.25% and 10% by weight of polyacrylate blend skin layer or from 1% to 5% by weight of polyacrylate blend skin layer.

Alternatively or in addition to the UVA, the polyacrylate blend skin layer can include a hindered amine light stabilizer (HALS). A wide variety of HALS are commercially available including, for example, under the tradenames TINUVIN or CHIMASSORB from Ciba Specialty Chemicals or under the tradename LOWILITE from Great Lake Chemical Corp. In some embodiments, a HALS is present in the polyacrylate blend skin layer in an amount between 0.25% and 10% by weight of polyacrylate blend skin layer or from 1% to 5% by weight of polyacrylate blend skin layer.

The polyacrylate blend skin layer can be formed such that it diffuses light. The diffusion property can be accomplished by using an inherently diffuse polymeric material, by imparting a diffuse pattern onto the polyacrylate blend skin layer during manufacture or further processing, e.g., by applying a rough strippable skin layer (described below) to the polyacrylate blend skin layer during co-extrusion. Light diffusive features in the polyacrylate blend skin layer can also be accomplished by incorporation of small particles with refractive indices differing from that of the polyacrylate blend skin layer, or with additives that induce voiding in the polyacrylate skin layer.

The roughened surface formed by the rough strippable skin layer or by addition of particles to the polyacrylate blend skin layer can lower the film's coefficient of friction thus reducing the film's tendency to adhere to adjacent surfaces such as glass or other rigid films. Reducing the film's adherence to adjacent surfaces removes or reduces the impact of an additional constraint (e.g., an adjacent glass or film surface) on the film that would otherwise contribute to film warpage.

For many applications, it may be desirable to include sacrificial protective skins disposed on the polyacrylate blend skin layer, where the interfacial adhesion between the skin layer(s) and the polyacrylate blend skin layer is controlled so that the skin layers can be stripped from the polyacrylate blend skin layer before use. In some embodiments, it is beneficial if these sacrificial skins have sufficient adhesion to the polyacrylate blend skin layers that they can be re-applied after inspection of the film. These strippable skin layers can be used to protect the underlying optical body during storage and shipping. The strippable skin layers can be removed prior to use of the optical film. The strippable skin layers can be disposed onto the polyacrylate blend skin layer by coating, extrusion, or other suitable methods. In many embodiments, the strippable skin layer is formed by coextrusion with the polyacrylate blend skin layer. The strippable skin layers can be formed using any protective polymer material that has sufficient adherence (with or without adhesive as desired) to the polyacrylate blend skin layer so that the strippable skin layer will remain in place until the strippable skin layer is removed manually or mechanically. Suitable materials include, for example, polyolefins and, in some embodiments, low melting and low crystallinity polyolefins such as copolymers of syndiotactic polyrpropylene (for example, FINAPLAS 1571 from Total Petrochemical), copolymers of propylene and ethylene (for example, PP8650 from Total Petrochemical), or ethylene octene copolymers (for example, AFFINITY PT 1451 from Dow). Optionally, a mixture of polyolefin materials can be utilized for the strippable skin layer. In some embodiments, the strippable skin material has a melting point of 80° C. to 145° C. according to differential scanning calorimetry (DSC) measurement, or a melting point of 90° C. to 135° C., as desired. The skin layer resin can have a melt flow index of 7 to 18 g/10 minutes, or 10 to 14 g/10 minutes as measured according to ASTM D1238-95 ("Flow Rates of Thermoplastics by Extrusion Plastometer"), incorporated herein by reference, at a temperature of 230° C. and a force of 21.6 N.

In many embodiments, when the strippable skin layer is removed there will be no remaining material from the strippable skin layer or any associated adhesive, if used. In some embodiments, the strippable skin layer has a thickness of at least 12 micrometers. Optionally, the strippable skin layer includes a dye, pigment, or other coloring material so that it is easy to observe whether the strippable skin layer is on the optical body or not. This can facilitate proper use of the optical body. Other materials can be blended into the strippable skin layer to improve adhesion to the polyacrylate blend skin layers. Modified polyolefins containing vinyl acetate or maleic anhydride may be particularly useful for improving adhesion of the strippable skin layers to the polyacrylate blend skin layers.

In some exemplary embodiments, the materials of one or more strippable skin layers may be selected so that the adhesion of the skin(s) to the polyacrylate blend skin layer is characterized by a peel force of at least 2 g/in or more, or characterized by a peel force of a 4, 5, 10 or 15 g/in or more. In some exemplary embodiments, the optical bodies can be characterized by a peel force as high as 100 g/in or even 120 g/in. In other exemplary embodiments, the optical bodies can be characterized by a peel force of 50, 35, 30 or 25 g/in or less. In some exemplary implementations the adhesion can be in the range from 2 g/in to 120 g/in, from 4 g/in to 50 g/in, from 5 g/in to 35 g/in, or from 15 g/in to 25 g/in. In other exemplary embodiments, the adhesion can be within other suitable ranges. Peel forces over 120 g/in can be tolerated for some applications.

The peel force that can be used to characterize exemplary embodiments of the present disclosure can be measured as follows. In particular, the present test method provides a procedure for measuring the peel force needed to remove a strippable skin layer from an optical film (e.g., multilayer film, polycarbonate, etc.). Test-strips are cut from the optical body with a strippable skin layer adhered to the optical film.

The strips are typically about 1" width, and more than about 6" in length. The strips may be pre-conditioned for environmental aging characteristics (e.g., hot, hot & humid, cold, thermal-shock). Typically, the samples should dwell for more than about 24 hours prior to testing. The 1" strips are then applied to rigid plates, for example, using double-sided tape (such as Scotch™ double sided tape available from 3M), and the plate/test-strip assembly is fixed in place on the peel-tester platen. The leading edge of the strippable skin is then separated from the optical film and clamped to a fixture connected to the peel-tester load-cell. The platen holding the plate/test-strip assembly is then carried away from the load-cell at constant speed of about 90 inches/minute, effectively peeling the strippable skin layer from the substrate optical film at about an 180 degree angle. As the platen moves away from the clamp, the force required to peel the strippable skin layer off the film is sensed by the load cell and recorded by a microprocessor. The force required for peel is then averaged over 5 seconds of steady-state travel (preferably ignoring the initial shock of starting the peel) and recorded.

Other materials suitable for use in the strippable skin layer (s) include, for example, fluoropolymers such as polyvinylidene fluoride (PVDF), ethylene-tetrafluoroethylene fluoropolymers (ETFE), polytetrafluoroethylene (PTFE), copolymers of PMMA (or a coPMMA) and PVDF, or any of the THV or PFA materials available from 3M (St. Paul, Minn.). Processing aids such as DYNAMAR (available from 3M) or GLYCOLUBE (available from Lonza Corporation in Fair Lawn, N.J.) may enhance release characteristics of strippable skin layers.

Materials suitable for use in the strippable skin layer(s) generally include polyolefins, such as polypropylene and modified polypropylenes. Aliphatic polyolefins can be used. One suitable group of polypropylenes includes high density polypropylenes which exhibit particularly low adhesion to polyester and acrylic materials, and which are commonly used to make multilayer optical films. Polyethylene and their copolymers are also may be useful, including copolymers and propylene and ethylene. Other exemplary materials include polymethylpentene, cyclic olefin copolymers such as TOPAS available from Ticona Engineering Polymers (Florence, Ky.), copolymers of olefins with maleic anhydride, acrylic acid, or glycidyl methacrylate, or any of the HYTREL (thermoplastic polyester elastomer) or BYNEL (modified ethylene vinyl acetate) materials available from DuPont Corporation (Wilmington, Del.).

Syndiotactic and atactic vinyl aromatic polymers, which may be useful in some embodiments of the present disclosure, include poly(styrene), poly(alkyl styrene), poly(styrene halide), poly(alkyl styrene), poly(vinyl ester benzoate), and these hydrogenated polymers and mixtures, or copolymers containing these structural units. Examples of poly(alkyl styrenes) include: poly(methyl styrene), poly(ethyl styrene), poly(propyl styrene), poly(butyl styrene), poly(phenyl styrene), poly(vinyl naphthalene), poly(vinylstyrene), and poly (acenaphthalene) may be mentioned. As for the poly(styrene halides), examples include: poly(chlorostyrene), poly(bromostyrene), and poly(fluorostyrene). Examples of poly (alkoxy styrene) include: poly(methoxy styrene), and poly (ethoxy styrene). Among these examples, as particularly preferable styrene group polymers, are: polystyrene, polypmethyl styrene), poly(m-methyl styrene), polyp-tertiary butyl styrene), poly(p-chlorostyrene), poly(m-chloro styrene), polyp-fluoro styrene), and copolymers of styrene and p-methyl styrene may be mentioned. Furthermore, as comonomers of syndiotactic vinyl-aromatic group copolymers, besides monomers of above explained styrene group polymer, olefin monomers such as ethylene, propylene, butene, hexene, or octene; diene monomers such as butadiene, isoprene; polar vinyl monomers such as cyclic diene monomer, methyl methacrylate, maleic acid anhydride, or acrylonitrile may be mentioned.

Aliphatic copolyesters and aliphatic polyamides may also be useful materials for strippable boundary layers. As for polyester polymers and copolymers, the diacids can be chosen from terephthalic acid, isophthalic acid, phthalic acid, all isomeric naphthalenedicarboxylic acids (2,6-, 1,2-, 1,3-, 1,4-, 1,5-, 1,6-, 1,7-, 1,8-, 2,3-, 2,4-, 2,5-, 2,7-, and 2,8-), bibenzoic acids such as 4,4'-biphenyl dicarboxylic acid and its isomers, trans-4,4'-stilbene dicarboxylic acid and its isomers, 4,4'-diphenyl ether dicarboxylic acid and its isomers, 4,4'-diphenylsulfone dicarboxylic acid and its isomers, 4,4'-benzophenone dicarboxylic acid and its isomers, halogenated aromatic dicarboxylic acids such as 2-chloroterephthalic acid and 2,5-dichloroterephthalic acid, other substituted aromatic dicarboxylic acids such as tertiary butyl isophthalic acid and sodium sulfonated isophthalic acid, cycloalkane dicarboxylic acids such as 1,4-cyclohexanedicarboxylic acid and its isomers and 2,6decahydronaphthalene dicarboxylic acid and its isomers, bi- or multi-cyclic dicarboxylic acids (such as the various isomeric norbornane and norbornene dicarboxylic acids, adamantane dicarboxylic acids, and bicyclo-octane dicarboxylic acids), alkane dicarboxylic acids (such as sebacic acid, adipic acid, oxalic acid, malonic acid, succinic acid, glutaric acid, azelaic acid, and dodecane dicarboxylic acid.), and any of the isomeric dicarboxylic acids of the fused-ring aromatic hydrocarbons (such as indene, anthracene, phenenanthrene, benzonaphthene, fluorene and the like). Alternatively, alkyl esters of these monomers, such as dimethyl terephthalate, may be used.

Suitable diol comonomers include but are not limited to linear or branched alkane diols or glycols (such as ethylene glycol, propanediols such as trimethylene glycol, butanediols such as tetramethylene glycol, pentanediols such as neopentyl glycol, hexanediols, 2,2,4-trimethyl-1,3-pentanediol and higher diols), ether glycols (such as diethylene glycol, triethylene glycol, and polyethylene glycol), chain-ester diols such as 3-hydroxy-2,2-dimethylpropyl-3-hydroxy-2,2-dimethyl propanoate, cycloalkane glycols such as 1,4-cyclohexanedimethanol and its isomers and 1,4-cyclohexanediol and its isomers, bior multicyclic diols (such as the various isomeric tricyclodecane dimethanols, norbornane dimethanols, norbornene dimethanols, and bicyclo-octane dimethanols), aromatic glycols (such as 1,4-benzenedimethanol and its isomers, 1,4-benzenediol and its isomers, bisphenols such as bisphenol A, 2,2'-dihydroxy biphenyl and its isomers, 4,4' dihydroxymethyl biphenyl and its isomers, and 1,3-bis(2-hydroxyethoxy)benzene and its isomers), and lower alkyl ethers or diethers of these diols, such as dimethyl or diethyl diols.

In some embodiments, one or more strippable skin layers are rough strippable skin layer or layers. The rough strippable skin layer can assist in forming a rough polyacrylate blend skin layer surface as described above. It has been found that these and related goals can be accomplished by careful selection of the materials for making the continuous phase and the disperse phase and ensuring their compatibility with at least some of the materials used to make the optical layer and/or polyacrylate blend skin layer. In some embodiments, the continuous phase of the rough strippable skin layers have low crystallinity or are sufficiently amorphous in order to remain adhered to the polyacrylate blend skin layer for a desired period of time.

In many embodiments, the degree of adhesion of the rough strippable skin layers to an adjacent surface or surfaces of the polyacrylate blend skin layer(s), as well as the degree of surface roughness, can be adjusted to fall within a desired range by blending in more crystalline or less crystalline materials, more adhesive or less adhesive materials, or by promoting the formation of crystals in one or more of the materials through subsequent processing steps. In some exemplary embodiments, two or more different materials with different adhesions can be used as co-continuous phases included into the continuous phase of the rough strippable skin layers. For example, a material with relatively high crystallinity, such as high density polyethylene (HDPE) or polycaprolactone, can be blended into the rough strippable skin layers in order to impart rough texture into the surface of a polyacrylate blend skin layer that is adjacent to the rough strippable skin layer and to affect adhesion. Nucleating agents can also be blended into the rough strippable skin layers in order to adjust the rate of crystallization of one or more of the phases in the strippable skin composition. In some exemplary embodiments, pigments, dyes or other coloring agents can be added to the materials of the rough strippable skins for improved visibility of the skin layers.

The degree of surface roughness of the rough strippable skin layers can be adjusted similarly by mixing or blending different materials, for example, polymeric materials, inorganic materials, or both into the disperse phase. In addition, the ratio of disperse phase to continuous phase can be adjusted to control the degree of surface roughness and adhesion and will depend on the particular materials used. Thus, one, two or more polymers would function as the continuous phase, while one, two or more materials, which may or may not be polymeric, would provide a disperse phase with a suitable surface roughness for imparting a surface texture. The one or more polymers of the continuous phase can be selected to provide a desired adhesion to the material of the polyacrylate blend skin layer. For example, HDPE could be blended into low crystallinity syndiotactic polypropylene (sPP) for improving surface roughness along with a low crystallinity poly(ethylene octene) (PE-PO) for improving strippable skin adhesion.

Where the disperse phase is capable of crystallization, the roughness of the strippable skin layer or layers can be enhanced by crystallization of this phase at an appropriate extrusion processing temperature, degree of mixing, and quenching, as well as through addition of nucleation agents, such as aromatic carboxylic-acid salts (sodium benzoate); dibenzylidene sorbitol (DBS), such as MILLAD 3988 from Milliken & Company; and sorbitol acetals, such as IRGA-CLEAR clarifiers by Ciba Specialty Chemicals and NC-4 clarifier by Mitsui Toatsu Chemicals. Other nucleators include organophosphate salts and other inorganic materials, such as ADKSTAB NA-11 and NA-21 phosphate esters from Asahi-Denka and HYPERFORM HPN-68, a norbornene carboxylic-acid salt from Milliken & Company. In some exemplary embodiments, the disperse phase includes particles, such as those including organic and/or inorganic materials, that will protrude from the surface of the rough strippable skin layers and impart surface structures into the polyacrylate blend skin layer when the optical body is processed, e.g., extruded, oriented or laminated together.

The disperse phase of the rough strippable skin layers can include particles or other rough features that are sufficiently large (for example, at least 0.1 micrometers average diameter) to be used to impart a surface texture into the outer surface of an adjacent layer of the polyacrylate blend skin layer by application of pressure and/or temperature to the polyacrylate blend skin layer with the rough strippable skin layer or layers. At least a substantial portion of protrusions of the disperse phase should typically be larger than the wavelength of the light it is illuminated with but still small enough not to be resolved with an unaided eye. Such particles can include particles of inorganic materials, such as silica particles, talc particles, sodium benzoate, calcium carbonate, a combination thereof or any other suitable particles. Alternatively, the disperse phase can be formed from polymeric materials that are (or become) substantially immiscible in the continuous phase under the appropriate conditions.

The disperse phase can be formed from one or more materials, such as inorganic materials, polymers, or both that are different from at least one polymer of the continuous phase and immiscible therein, with the disperse polymer phases having typically a higher degree of crystallinity than the polymer or polymers of the continuous phase. In some exemplary embodiments, the use of more than one material for the disperse phase can result in rough features or protrusions of different sizes or compounded protrusions, such as "protrusion-on-protrusion" configurations. Such constructions can be beneficial for creating hazier surfaces on optical films. In some embodiments, the disperse phase is only mechanically miscible or immiscible with the continuous phase polymer or polymers. The disperse phase material or materials and the continuous phase material or materials can phase separate under appropriate processing conditions and form distinct phase inclusions within the continuous matrix, and particularly at the interface between the optical film and the rough strippable skin layer.

Exemplary polymers that are particularly suitable for use in the disperse phase include styrene acrylonitrile, modified polyethylene, polycarbonate and copolyester blend, ϵ-caprolactone polymer, such as TONE™ P-787, available from Dow Chemical Company, random copolymer of propylene and ethylene, other polypropylene copolymers, poly(ethylene octene) copolymer, anti-static polymer, high density polyethylene, medium density polyethylene, linear low density polyethylene and polymethyl methacrylate. The disperse phase of the rough strippable skin layers may include any other appropriate material, such as any suitable crystallizing polymer and it may include the same materials as one or more of the materials used in the optical film.

Materials suitable for use in the continuous phase of the strippable layer include, for example, polyolefins, such as low melting and low crystallinity polypropylenes and their copolymers; low melting and low crystallinity polyethylenes and their copolymers, low melting and low crystallinity polyesters and their copolymers, or any suitable combination thereof. Such low melting and low crystallinity polypropylenes and their copolymers consist of propylene homopolymers and copolymers of propylene and ethylene or alpha-olefin materials having between 4 to 10 carbon atoms. The term "copolymer" includes not only the copolymer, but also terpolymers and polymers of four or more component polymers. Suitable low melting and low crystallinity polypropylenes and their copolymers include, for example, syndiotactic polypropylene (such as, FINAPLAS 1571 from Total Petrochemicals, Inc.), which is a random copolymer with an extremely low ethylene content in the syndiotactic polypropylene backbone, and random copolymers of propylene (such as PP8650 or PP6671 from Total Petrochemical, which is now Total Petrochemicals, Inc.) The described copolymers of propylene and ethylene can also be extrusion blended with homopolymers of polypropylene to provide a higher melting point skin layer if needed.

Other suitable low melting and low crystallinity polyethylenes and polyethylene copolymers include, for example, linear low density polyethylene and ethylene vinyl alcohol copolymers. Suitable polypropylenes include, for example, random copolymers of propylene and ethylene (for example, PP8650 from Total Petrochemicals, Inc.), or ethylene octene copolymers (for example, AFFINITY PT 1451 from Dow Chemical Company). In some embodiments, the continuous phase includes an amorphous polyolefin, such as an amorphous polypropylene, amorphous polyethylene, an amorphous polyester, or any suitable combination thereof or with other materials. In some embodiments, the materials of the rough strippable skin layers can include nucleating agents, such as sodium benzoate to control the rate of crystallization. Additionally, anti-static materials, anti-block materials, coloring agents such as pigments and dyes, stabilizers, and other processing aids may be added to the continuous phase. Additionally or alternatively, the continuous phase of the rough strippable skin layers may include any other appropriate material. In some exemplary embodiments, migratory anti-static agents can be used in the rough strippable skin layers to lower their adhesion to the optical films.

The polyacrylate blend skin layer can be added to opposing sides of the optical film. However, in some implementations the polyacrylate blend skin layer is added to just one side of the optical film. In some such exemplary embodiments, the presence of one polyacrylate blend skin layer may encourage curling of the film, such as for making an optical body that will wrap around a fluorescent light tube.

The optical body can also optionally include one or more layers in addition to the optical film, the polyacrylate blend skin layer, and the strippable layer. When one or more additional layers are present, they can function to improve the integrity of the composite optical body. In particular, the layers can serve to bind the optical film to the polyacrylate blend skin layer.

Various additional compounds can be added, including the comonomers previously listed in the optical film. Extrusion aids such as plasticizers and lubricants can be added for improved processing and adhesion to other layers. Also, particles such as inorganic spheres or polymer beads with a different refractive index from the adhesive polymer can be used.

During processing, the polyacrylate blend skin layer and peelable (strippable) skin layer(s) can be extrusion coated together with the optical film at temperatures exceeding 250° C. Therefore, the optical film polymers should be able to withstand exposure to temperatures greater than 250° C. In many embodiments, the optical film undergoes various rolling steps during processing, and is flexible. The strippable layer or layers can be thermally stable in a melt phase at temperatures above 220° C. Thus, the strippable layer should not substantially degrade during extrusion at temperatures greater than 220° C. The strippable layer can be less than 2 mils (about 50 micrometers) thick, or less than 1 mil (about 25 micrometers) thick, or less than 0.5 mil (about 12 micrometers) thick.

Various methods may be used for forming the composite optical body of the present disclosure. As stated above, the optical bodies can take on various configurations, and thus the methods vary depending upon the particular configuration of the final optical body. A step common to all methods of forming the composite optical body is adhering the optical film to the polyacrylate blend skin layer. This step can be conducted concurrently with or subsequently to making the optical film and in a variety of ways, such as co-extruding various layers, extrusion coating the layers, or co-extrusion coating of the layers (such as when a polyacrylate blend skin layer and an intermediate layer are simultaneously extrusion coated onto the optical film).

Figure 3:
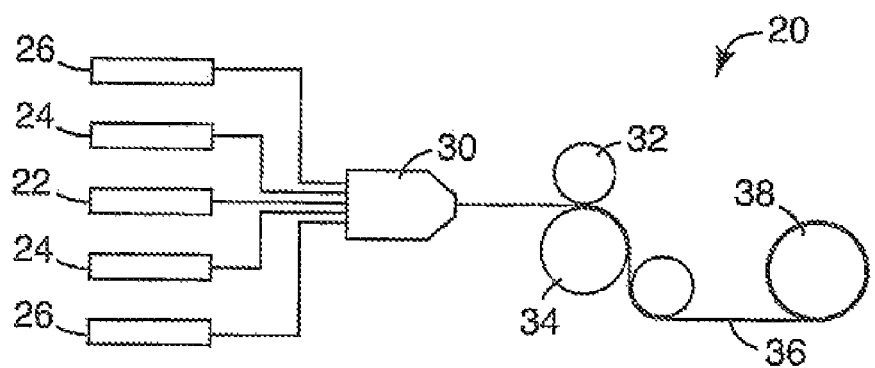
FIG. 3 is a plan view of an illustrative system for forming an optical body in accordance with of the disclosure.

FIG. 3 shows a schematic plan view of an illustrative system for forming an optical body in accordance with the disclosure. The system 20 includes a plurality of feed blocks 22, 24 and 26 providing material to an extruder 30 for co-extrusion. While five feed blocks are shown, any useful number of feed blocks may be included in the co-extrusion system 20. The illustrated feed blocks include an optical film feed block 22, two polyacrylate blend skin layer feed blocks 24, and two strippable skin feed blocks 26.

The extruder co-extrudes the materials from the feed blocks into a single multilayer optical film 36. In the illustrated embodiment, the multilayer optical film 36 travels between and over several rolls 32, 34 and placed onto a winder 38. After cooling, the multi-layer optical film 36 can be subsequently processed, such as by cutting into sheets.

In some embodiments, the co-extruded film can be oriented by stretching individual sheets of the optical body material in heated air. For economical production, stretching may be accomplished on a continuous basis in a standard length orienter, tenter oven, or both, or using any other suitable stretcher. Economies of scale and line speeds of standard polymer film production may be achieved thereby achieving manufacturing costs that are substantially lower than costs associated with commercially available absorptive polarizers.

One method of creating a birefringent system is to biaxially stretch or draw (e.g., stretch along two dimensions) a multilayer stack in which at least one of the materials in the stack has its index of refraction affected by the stretching process (e.g., the index either increases or decreases). Biaxial stretching of the multilayer stack may result in differences between refractive indices of adjoining layers for planes parallel to both axes thus resulting in reflection of light in both planes of polarization. Specific methods and materials are taught in PCT patent application WO 99/36812, incorporated herein by reference in its entirety.

For example, to make a mirror, two uniaxially stretched polarizing sheets are positioned with their respective orientation axes rotated 90° C., or the sheet is biaxially stretched. Biaxially stretching the multilayered sheet will result in differences between refractive indices of adjoining layers for planes parallel to both axes thereby resulting in reflection of light in both planes of polarization directions.

In other exemplary embodiments, the optical bodies constructed according to the present disclosure may be stretched or drawn uniaxially or substantially uniaxially (e.g., along the machine direction or along the direction substantially orthogonal to the machine direction). Where an optical film included into an optical body of the present disclosure is a reflective polarizer, it may be beneficial for the optical body to be drawn uniaxially or substantially uniaxially in the transverse direction (TD), while allowed to relax in the machine direction (MD) as well as the normal direction (ND). Suitable methods and apparatuses that can be used to draw such exemplary embodiments of the present disclosure are described in U.S. Application Publication Nos. 2002/0190406, 2002/0180107, 2004/0099992 and 2004/0099993, the disclosures of which are hereby incorporated by reference herein.

The pre-stretch temperature, stretch temperature, stretch rate, stretch ratio, heat set temperature, heat set time, heat set relaxation, and cross-stretch relaxation are selected to yield a multilayer device having the desired refractive index relationship. These variables are inter-dependent; thus, for example, a relatively low stretch rate could be used if coupled with, e.g., a relatively low stretch temperature. It will be apparent to one of ordinary skill how to select the appropriate combination of these variables to achieve the finished article with desired properties. In many embodiments, a stretch ratio is in the range from 1:2 to 1:10, or from 1:3 to 1:7 in the machine or transverse direction and from 1:0.5 to 1:10, or from 1:0.5 to 1:7 orthogonal to the machine or transverse direction.

EXAMPLES

Methods

One example of a method for observing warp is as follows: Clean two 9.5"×12.5" (24.1×31.8 cm) flat pieces of double strength glass with isopropyl alcohol. A 9"×12" (22.9×30.5 cm) piece of the optical body is attached to one piece of glass on two short sides and one of the long sides, leaving the remaining long side unconstrained. To attach the optical body, first attach Double Stick Tape (3M, St. Paul, Minn.) to a piece of glass such that the tape is 0.5" (1.3 cm) from three edges of the glass and will be exactly covered by 3 sides of the optical body. Avoid overlapping the ends of the tape. Place the optical body on the tape such that the optical body is tensioned across the tape and is held above the glass surface by the thickness of the tape (about 0.1 mm). Roll the optical body down to the tape with a 4.5 lb. (2 kg) roller once in each direction, avoiding extra force.

Place three 0.1 mm thick, 0.5" (1.3 cm) wide polyethylene terephthalate (PET) shims onto the rolled optical body, the shims being exactly above the tape and of the same lengths, but on the opposite sides of the optical body. Avoid overlapping the shims. Place the top piece of glass on top of the shims and exactly aligned with the bottom piece of glass.

This completes a sandwiched construction of glass-tape-optical film-shim-glass, in which the optical body is constrained at three edges and substantially free floating in the center. This construction is attached together with 4 binder clips as are commonly used to hold stacks of paper together (Binder Clips, Officemate International Corporation, Edison, N.J.). The clips should be of an appropriate size to apply pressure to the center of the tape (approximately 0.75" (1.9 cm) from the edge of the glass) and are positioned two each on the short sides of the construction, each about 0.75" (1.9 cm) away from the bottom and top of the optical body.

This completed construction is placed in a thermal shock chamber (Model SV4-2-2-15 Environmental Test Chamber, Envirotronics, Inc., Grand Rapids, Mich.) and subjected to 96 cycles, a cycle consisting of one hour at 85° C. followed by one hour at −35° C. The film is then removed from the chamber and inspected for wrinkles Warpage is considered unacceptable when there are many deep wrinkles across the surface of the film. When there are few shallow wrinkles or the film appears smooth, warpage is generally considered acceptable.

Example 1

A multi-layer reflective polarizer was constructed with first optical layers comprising PEN (polyethylene naphthalate) and second optical layers comprising coPEN (copoyethelene naphthalate). The PEN and coPEN were coextruded through a multi-layer melt manifold and multiplier to form 825 alternating first and second optical layers. This multi-layer film also contained two internal and two external protective boundary layers of the same coPEN as the second optical layers for a total of 829 layers. In addition, two external skin layers were coextruded on both sides the optical layer stack. These polyacrylate blend skin layer were about 18 micrometers thick and comprised 95 wt. % PMMA (VO44 from Total Petrochemical) and 5 wt. % anti-static polymer (PELESTAT 6321 from Sanyo Chemical Industries). Strippable skin layers formed from a blend of 96 wt % syndiotactic polypropylene (PP1571 from Total Petrochemical) and 4 wt. % anti-static polymer (PELESTAT 300 from Sanyo Chemical Industries) were formed over the PMMA blend structural layers. An extruded cast web of the above-construction was then heated in a tentering oven with air at 150° C. for 45 seconds and then uniaxially oriented at a 6:1 draw ratio.

Samples were prepared, as described above, where one sample did not have a polyacrylate skin layer, one sample had a polyacrylate skin layer, and two samples had a polyacrylate/PELESTAT 6321 blend skin layer at 5 wt. % and 10 wt. % PELESTAT 6321. Warp testing indicated that the optical body with the PMMA/PELESTAT blend polyacrylate blend skin layer samples had better warp resistance than a similar optical body with no polyacrylate skin layers and better warp resistance than a similar optical body with the polyacrylate skin layers made using PMMA alone. The optical body with the PMMA/PELESTAT 10 wt. % blend polyacrylate blend skin layer had better warp resistance than the optical body with the PMMA/PELESTAT 5 wt. % blend polyacrylate blend skin layer.

Example 2

A multi-layer reflective polarizer could be constructed with first optical layers comprising PEN (polyethylene naphthalate) and second optical layers comprising coPEN (copolyethylene naphthalate). The PEN and coPEN would be coextruded through a multi-layer melt manifold and multiplier to form 825 alternating first and second optical layers. This multi-layer film would also contain two internal and two external protective boundary layers of the same coPEN as the second optical layers for a total of 829 layers. In addition, two structural external skin layers would be coextruded on both sides of the optical layer stack. These polyacrylate blend skin layers would about 18 micrometers thick and comprised 85 wt. % PMMA (VO44 from Total Petrochemical) and 15 wt. % anti-static polymer (PELESTAT 300 from Sanyo Chemical Industries) would be formed over the PMMA blend structural layers. An extruded case web of the above-construction would then be heated in a tentering oven with air at 150° C. for 45 seconds and then uniaxially oriented at a 6:1 draw ratio.

Example 3

A multi-layer reflective polarizer could be constructed with first optical layers comprising PEN (polyethylene naphthalate) and second optical layers comprising coPEN (copolyethylene naphthalate). The PEN and coPEN would be coextruded through a multi-layer melt manifold and multiplier to form 825 alternating first and second optical layers. This multi-layer film would also contain two internal and two external protective boundary layers of the same coPEN as the second optical layers for a total of 829 layers. In addition, two structural external skin layers would be coextruded on both sides of the optical layer stack. These polyacrylate blend skin layers would be about 18 micrometers thick and comprised 60 wt. % PMMA (VO44 from Total Petrochemical) and 40 wt. % PVDF (SOLEF 1008 from Soltex Polymer Corporation. Strippable skin layers formed from a blend of 96 wt. % syndiotactic polypropylene (PP1571 from Total Petrochemical) and 4 wt. % anti-static polymer (PELESTAT 300 from Sanyo Chemical Industries) would be formed over the PMMA blend structural layers. An extruded cast web of the above construction would then be heated in a tentering oven with air at 150° C. for 45 seconds and then uniaxially oriented at a 6:1 draw ratio.

Example 4

A multi-layer reflective polarizer could be constructed with first optical layers comprising PEN (polyethylene naphthalate) and second optical layers comprising coPEN (copolyethylene naphthalate). The PEN and coPEN would be coextruded through a multi-layer melt manifold and multiplier to form 825 alternating first and second optical layers. This multi-layer film would also contain two internal and two external protective boundary layers for a total of 829 layers. In addition. two structural external skin layers would be coextruded on both sides the optical layer stack. These polyacrylate blend skin layers would be about 18 micrometers thick and comprised 84 wt. % PMMA (VO44 from Total Petrochemical), 15 wt. % antistatic polymer (PELESTAT 300 from Sanyo Chemical Industries), and 1 wt % UVA (TINUVIN 1577 from Ciba Specialty Chemical). Strippable skin layers formed from a blend of 96 wt % syndiotactic polypropylene (PP 1571 from Total Petrochemical) and 4 wt % anti-static polymer (PELESTAT 300 from Sanyo Chemical Industries) would be formed over the PMMA blend structural layers. An extruded cast web of the above construction would then be heated in a tentering oven with air at 150° C. for 45 seconds and then uniaxially oriented at a 6:1 draw ratio.

Example 5

Biaxially oriented multi-layer optical films could be made with similar polymer constructions to the above examples for use as a Visible Mirror.

Example 6

A multi-layer film was coextruded with PEN (0.48 IV PEN available from 3M Company) core layers, PMMA (VO44 available from Total Petrochemical) inner skin layers, and syndiotactic polypropylene (PP1571 from Total Petrochemical) outer skin layers using a 5 layer feedblock and extrusion die. The PEN layers were extruded at 20 lbs/hr using a 1.5" single screw extruder. The PMMA inner skin layers were extruded at 10 lbs/hr using a 25 mm twin screw extruder. The syndiotactic polypropylene layers were extruded at 5 lbs/hr using a 1.0" single screw extruder. The multi-layer film was cast onto a chilled roll with a temperature of 90° F. at 9.5 fpm to form a 20 mil cast web.

The 20 mil cast web was then biaxially oriented in a batch orientation process by first preheating the web for 50 seconds at 150° C. and then stretching the cast web at 100%/second and draw ratios of 3.5×3.5.

After first removing the strippable syndiotactic polypropylene skin layers, this film was then exposed to a light source of 1200 kJ/m$^2$ at 340 nm in a test run according to ASTM G155 using a water-cooled xenon arc with daylight filters. The film exhibited an optical density increase of 0.0614 at 420 nm.

Example 7

A multi-layer film with PEN core layers, PMMA inner skin layers, and syndiotactic polypropylene outer skin layers was produced as described in Example 6 with the addition of 1 wt % Tinuvin 1577 and 0.5 wt % CHIMASSORB 119 (HALS available from Ciba Speciality Chemicals) to the PMMA inner skin layers.

Example 8

A multi-layer film with PEN core layers, PMMA inner skin layers, and syndiotactic polypropylene outer skin layers was produced as described in Example 6 with the addition of 2 wt % TINUVIN 1577 to the PMMA inner skin layers.

Example 9

A multi-layer film with PEN core layers, PMMA inner skin layers, and syndiotactic polypropylene outer skin layers was produced as described in Example 6 with the addition of 3 wt % TINUVIN 1577 and 1.0 wt % CHIMASSORB 119 to the PMMA inner skin layers.

After first removing the strippable syndiotactic polypropylene skin layers, this film was then exposed to a light source of 1200 kJ/m$^2$ at 340 nm in a test run according to ASTM G155 using a water-cooled xenon arc with daylight filters. The film exhibited an optical density increase of 0.0361 at 420 nm.

Example 10

A multi-layer film with PEN core layers, PMMA inner skin layers, and syndiotactic polypropylene outer skin layers was produced as described in Example 6 with the addition of 1 wt % TINUVIN 1577 and 0.5 wt % CHIMASSORB 944 (HALS available from Ciba Speciality Chemicals) to the PMMA inner skin layers.

Example 11

A multi-layer film with PEN core layers, PMMA inner skin layers, and syndiotactic polypropylene outer skin layers was produced as described in Example 6 with the addition of 3 wt % TINUVIN 1577 and 1.0 wt % CHIMASSORB 944 to the PMMA inner skin layers.

Example 12

A multi-layer film was coextruded with PET (0.74 IV PET available from Eastman Company) core layers, coPMMA (75 mol % methyl methacrylate and 25 mol % ethyl acrylate known as CP63 available from Total Petrochemical) inner skin layers, and syndiotactic polypropylene (PP1571 from Total Petrochemical) outer skin layers using a 5 layer feedblock and extrusion die. The PET layers were extruded at 20 lbs/hr using a 1.5" single screw extruder. The coPMMA inner skin layers were extruded at 10 lbs/hr using a 25 mm twin screw extruder. The syndiotactic polypropylene layers were extruded at 5 lbs/hr using a 1.0" single screw extruder. The multi-layer film was cast onto a chilled roll with a temperature of 90° F. at 9.5 fpm to form a 20 mil cast web.

The 20 mil cast web was then biaxially oriented in a batch orientation process by first preheating the web for 50 seconds at 100° C. and then stretching the cast web at 100%/second and draw ratios of 4×4.

After first removing the strippable syndiotactic polypropylene skin layers, this film was then exposed to a light source of 1200 kJ/m$^2$ at 340 nm in a test run according to ASTM G155 using a water-cooled xenon arc with daylight filters. The film exhibited an optical density increase of 0.0189 at 420 nm.

Example 13

A multi-layer film with PET core layers, coPMMA inner skin layers, and syndiotactic polypropylene outer skin layers was produced as described in Example 12 with the addition of 1 wt % TINUVIN 1577 and 0.5 wt % CHIMASSORB 119 to the coPMMA inner skin layers.

Example 14

A multi-layer film with PET core layers, coPMMA inner skin layers, and syndiotactic polypropylene outer skin layers was produced as described in Example 12 with the addition of 2 wt % TINUVIN 1577 to the coPMMA inner skin layers.

Example 15

A multi-layer film with PET core layers, coPMMA inner skin layers, and syndiotactic polypropylene outer skin layers was produced as described in Example 12 with the addition of 3 wt % TINUVIN 1577 and 1.0 wt % CHIMASSORB 119 to the coPMMA inner skin layers.

After first removing the strippable syndiotactic polypropylene skin layers, this film was then exposed to a light source of 1200 kJ/m$^2$ at 340 nm in a test run according to ASTM G155 using a water-cooled xenon arc with daylight filters. The film exhibited an optical density increase of 0.0058 at 420 nm.

Example 16

A multi-layer film with PET core layers, coPMMA inner skin layers, and syndiotactic polypropylene outer skin layers was produced as described in Example 12 with the addition of 1 wt % TINUVIN 1577 and 0.5 wt % CHIMASSORB 944 to the coPMMA inner skin layers.

Example 17

A multi-layer film with PET core layers, coPMMA inner skin layers, and syndiotactic polypropylene outer skin layers was produced as described in Example 12 with the addition of 3 wt % TINUVIN 1577 and 1.0 wt % CHIMASSORB 944 to the coPMMA inner skin layers.

All references and publications cited herein are expressly incorporated herein by reference in their entirety into this disclosure. Illustrative embodiments of this disclosure are discussed and reference has been made to possible variations within the scope of this disclosure. These and other variations and modifications in the disclosure will be apparent to those skilled in the art without departing from the scope of this disclosure, and it should be understood that this disclosure is not limited to the illustrative embodiments set forth herein. Accordingly, the disclosure is to be limited only by the claims provided below.

What is claimed is:

1. An optical body, comprising:
   an optical film comprising polyester, the optical film comprising alternating first and second optical layers, the first and second optical layers comprising polyesters;
   a first extruded skin layer disposed on a first side of the optical film, the first extruded skin layer comprising a mixture of a polyacrylate and an anti-static polymer; and
   a first extruded strippable skin layer disposed on the first extruded skin layer;
   wherein the first extruded skin layer, when exposed by removal of the first extruded strippable skin layer, is adapted to avoid adhesion to a glass surface for reduced warpage of the optical body.

2. The optical body of claim 1, further comprising:
   a second extruded skin layer comprising polyacrylate disposed on a second side of the optical film; and
   a second extruded strippable skin layer disposed on the second extruded skin layer.

3. The optical body of claim 1, wherein the optical film comprises an oriented multilayer optical film.

4. The optical body of claim 1, wherein the optical film comprises polyethylene terephthalate or copolyethylene terephthalate.

5. The optical body of claim 1, wherein the optical film comprises polyethylene naphthalate or copolyethylene naphthalate.

6. The optical body of claim 5, wherein the polyacrylate comprises a copolymer of polymethylmethacrylate.

7. The optical body of claim 5, wherein the polyacrylate comprises polymethylmethacrylate.

8. The optical body of claim 1, wherein the first extruded skin layer further comprises a second polymer miscible in the polyacrylate.

9. The optical body of claim 1, wherein the first extruded skin layer further comprises polyvinylidene fluoride.

10. The optical body of claim 1, wherein the first extruded skin layer further comprises a UV absorber.

11. The optical body of claim 1, wherein the first extruded skin layer further comprises a UV absorber and a hindered amine light stabilizer.

12. The optical body of claim 1, wherein the first extruded strippable skin layer comprises a polyolefin.

13. The optical body of claim 1, wherein the first extruded strippable skin layer comprises an anti-static polymer.

\* \* \* \* \*

UNITED STATES PATENT AND TRADEMARK OFFICE
CERTIFICATE OF CORRECTION

PATENT NO. : 8,182,924 B2
APPLICATION NO. : 12/780312
DATED : May 22, 2012
INVENTOR(S) : Timothy J Hebrink et al.

It is certified that error appears in the above-identified patent and that said Letters Patent is hereby corrected as shown below:

In the Specification

Column 7
Line 54, Delete "napthalate" and insert -- naphthalate --, therefor.

Column 8
Line 51, Delete "atatctic" and insert -- atactic --, therefor.
Line 51, Delete "isotatctic" and insert -- isotactic --, therefor.
Line 64, Delete "syndiotatic" and insert -- syndiotactic --, therefor.

Column 10
Line 56, Delete "Atohass" and insert -- Atohaas --, therefor.

Column 12
Line 17, Delete "polyrpropylene" and insert -- polypropylene --, therefor.

Column 13
Line 61-62, Delete "polyp-methyl styrene)," and insert -- poly(p-methyl styrene), --, therefor.
Line 62-63, Delete "polyp-tertiary butyl styrene)," and insert -- poly(p-tertiary butyl styrene), --, therefor.
Line 64, Delete "polyp-fluoro styrene)," and insert -- poly(p-fluoro styrene), --, therefor.

Column 14
Line 23, Delete "2,6decahydronaphthalene" and insert -- 2,6-decahydronaphthalene --, therefor.
Line 31-32, Delete "pheneanthrene," and insert -- phenanthrene, --, therefor.
Line 50-51, Delete "4,4' dihydroxymethyl" and insert -- 4,4'-dihydroxymethyl --, therefor.

Signed and Sealed this
Twenty-sixth Day of November, 2013

Margaret A. Focarino
*Commissioner for Patents of the United States Patent and Trademark Office*

Column 19
Line 49, Delete "wrinkles" and insert -- wrinkles. --, therefor.
Line 59, Delete "(copolyethelene" and insert -- (copolyethylene --, therefor.